Jan. 4, 1927.  
E. C. MOFFETT  
FUMIGATING PROCESS  
Filed May 7, 1924  
1,613,186
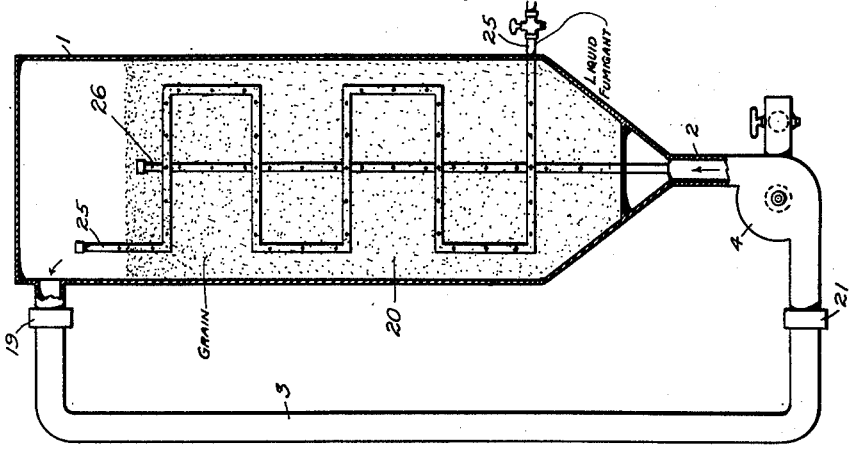
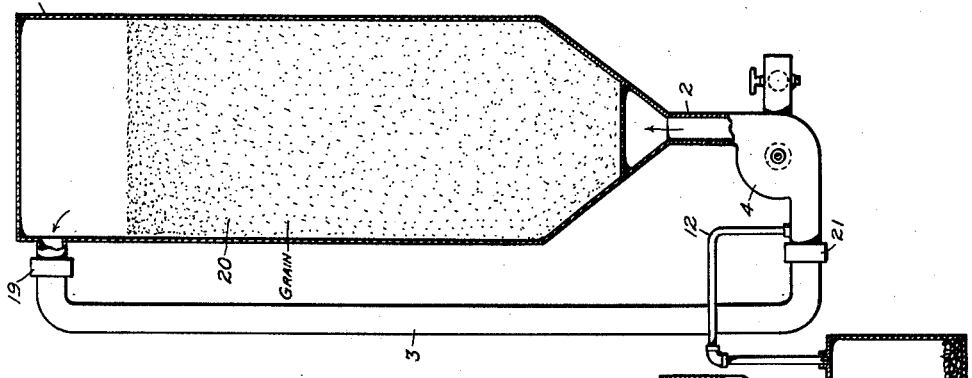
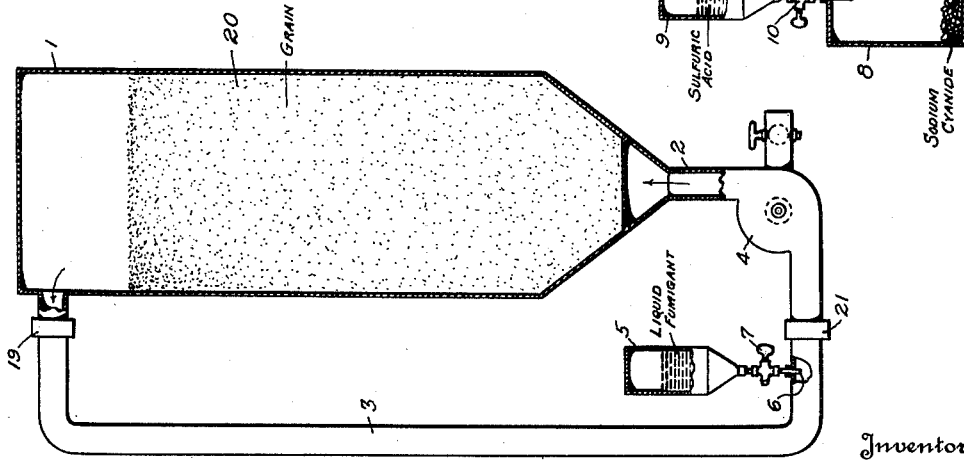
Inventor  
E.C. Moffett  
By J. A. Witherspoon  
Attorney Patented Jan. 4, 1927.

1,613,186

UNITED STATES PATENT OFFICE.

ERNEST C. MOFFETT, OF WOODBRIDGE, NEW JERSEY, ASSIGNOR TO AMERICAN CYANAMID COMPANY, OF NEW YORK, N. Y., A CORPORATION OF MAINE.

FUMIGATING PROCESS.

Application filed May 7, 1924. Serial No. 711,695.

This invention relates to an apparatus for and a process of fumigating grain and other material and has for its object to improve the procedures heretofore proposed.

With these and other objects in view the invention consists in the novel steps and combinations of steps constituting the process and in the novel construction constituting the apparatus, all as will be more fully hereinafter disclosed and particularly pointed out in the claims.

Referring to the accompanying drawings forming a part of this specification in which like numerals designate like parts in all the views.

Figure 1 is a diagrammatic sectional view of a fumigating means made in accordance with this invention.

Figure 2 is a similar view of a somewhat modified form of construction; and Figure 3, is a view similar to Figure 1 showing a still further modified form of construction.

In order that the precise invention may be the more clearly understood it is said: I am aware that it has been heretofore proposed to fumigate grain for the eradication of insects and other pests by subjecting it to the action of liquid hydrocyanic acid liberated within the mass of the grain in the form of a spray. In practice this prior method generally employed a pipe containing a plurality of openings to introduce the liquid hydrocyanic acid into the grain. This said prior method, however, was found to be objectionable in that the grain immediately surrounding the pipe was found to absorb the hydrocyanic acid to an objectionable extent and to thus prevent the efficient diffusion of the latter throughout the mass of grain. Consequently under such prior procedure a large percentage of insects was not brought within the influence of the hydrocyanaic acid and the treatment was therefore not found to be satisfactory in practice.

In addition to the above prior procedure it has also been proposed to employ hydrocyanic acid in the form of gas, and this second procedure was carried out by means of the well known pot method, in which hydrocyanic acid in a gaseous form was generated in containers as fast as it was needed through the action of a suitable acid on a soluble cyanide. Although this method was applicable in the fumigation of a great variety of materials, yet, it never attained a commercial success in the fumigation of grain and like products. In so far as I am aware the reason for this failure has been believed to be due to the fact that the gas would not sufficiently penetrate the mass of the grain to efficiently kill the pests. I have found however, that the fundamental reason for said failure resides in the peculiar ability of the grain to absorb the gaseous fumigant. That is in this prior gaseous fumigation procedure, the hydrocyanic acid in a higly concentrated condition was led into the mass of the grain, and the grain immediately surrounding the point of entrace of said gas absorbed the latter with such rapidity as to prevent its thorough diffusion throughout the entire mass of the said grain.

In the present method the foregoing objection resulting from the absorption of the fumigant by the grain or other material is avoided by subjecting the said grain to the action of a moving inert gas such as air, after or in conjunction with, the introduction of the fumigant within the mass of the grain. That is to say, in accordance with this invention one may introduce liquid hydrocyanic acid into the mass of the grain as heretofore, and then circulate air through the grain. By following the last named procedure I have discovered that a sufficient quantity of hydrocyanic acid may be effectually distributed throughout the entire mass of the grain to kill substantially all the insects present therein.

I have also discovered that the absorption of the fumigant by the grain may be decreased by introducing it into the mass of the grain as a dilute gaseous mixture. And I have still further discovered that the absorption of the said fumigant by any portion of the grain at the expense of other portions of the grain may be avoided if the gases containing said fumigant be kept in motion until the concentration of the fumigant is substantially uniform through the mass of the grain. It is, of course, obvious that the motion of the gases should be so controlled that every particle of the material being fumigated is reached by said moving gases.

In carrying out this invention with liquid hydrocyanic acid and referring to Figure 1 of the drawings one may proceed as follows: The grain 20 to be fumigated may be placed in a bin 1 and then air is circulated through the system by means of a fan or other device 4. Preferably this fan is connected by the pipe 2 to the bottom of the bin 1 and air is withdrawn from the top of the bin 1 by means of a pipe 3 leading from said top back to said fan 4 as illustrated. Joined to the pipe 3 as shown is the tank 5 containing the liquid fumigant, such as hydrocyanic acid. The connection between said tank 5 and the pipe 3 is controlled by the valve 7. Therefore, upon opening said valve 7 the fumigant will trickle down through the nozzle 6 with which said tank 5 is provided, enter said pipe 3, and be drawn by the air that is sucked back to fan 4; said acid is then forced along with the air through the mass of grain 20 as will be readily understood from the drawings. The valve 7 may be so regulated as to cause the liquid hydrocyanic acid to enter the air stream at such a rate that it will be volatilized as fast as it is introduced. The circulation of air and fumigant through the mass of grain 20 is continued until the desired quantity of fumigant has been introduced into the grain and until the concentration or partial pressure of the fumigant in the gases leaving the mass of grain is acertained by well known tests to be substantially the same as when entering the said mass of grain. When this condition of concentration is found to exist one may discontinue the circulation of the air and permit the system to remain closed for a predetermined time, or for a sufficient period of time to insure the killing of all the insects present. This period of time, of course, will vary with the concentration of the fumigant as well as with the kind of grain and the number of insects and character of insects to be destroyed. Ordinarily a period of say two hours or more will be sufficient, but experience and judgment will readily guide the operator. When the fumigation has been accomplished one may disconnect the pipe 3 from the bin 1 as by unscrewing the same at the joints 19 and 21 or by any other suitable means, whereupon the fan 4 may be operated to force air through the grain and thus drive out into the atmosphere the poisonous gases contained therein.

In carrying out this invention by means of gaseous hydrocyanic acid generated by said pot method, and referring to Figure 2 one may proceed as follows: A suitable generator such as 8 is provided in which is placed sodium cyanide, or other suitable cyanide, and in vessel 9 joined to said generator 8 as shown, there is placed a solution of sulphuric acid. A valve 10 controls the admission of sulphuric acid to the generator 8, and the pipe 12 leads off the gaseous hydrocyanic acid produced from the reaction between the sulphuric acid and the sodium cyanide. This pipe 12 is led into the pipe 3 as indicated or between the fan 4 and bin 1, whereupon the operation of the fan will force the gaseous hydrocyanic acid up through the grain 20 and back through the pipe 3 as in the preceding case.

In the still further modified form of the invention shown in Figure 3 the construction is the same as in Figure 1 except the liquid hydrocyanic acid is introduced through the perforated pipe 25 which may be of any desired form and air may be blown by the fan 4 through the perforated pipe 26 which also may be any desired form in order to more effectually disseminate and vaporize the liquid hydrocyanic acid throughout the interstices of the grain.

It will now be clear that the substance of this invention resides in the means and the method one employs either for exposing the grain or other material to a mixture of gases in which at no time is the partial pressure of the fumigant gas high enough to permit objectionable absorption, or for reducing the partial pressure of the fumigant gas in case the fumigant gas was previously introduced in such a way that objectionable partial pressures resulted. It will also be clear that the method comprises subjecting the material to a mechanically impelled or actuated moving gas, or gases containing the fumigant, the movement of the gases being such that substantially every portion of material being fumigated is brought into contact with said fumigant.

What is claimed is:

1. The process of fumigating a mass of particles of a material which consists in subjecting said particles throughout said mass to the action of a stream of gas containing said fumigant to prevent absorption of said fumigant.

2. The process of fumigating a mass of particles of a material capable of absorbing the fumigant which consists in subjecting said particles to the action of an inert gas containing the fumigant to prevent absorption of said fumigant.

3. The process of fumigating grain which consists in passing a moving gas containing hydrocyanic acid throughout the mass of the grain to prevent absorption of said fumigant.

4. The process of fumigating a mass of subdivided material which consists in subjecting a portion of the material to be fumigated to the action of the fumigant; and distributing the fumigant throughout the remainder of the material by means of a current of a gas.

5. The process of fumigating a mass of individual particles of a material capable of absorbing the fumigant which consists in subjecting a portion of the mass of material to the action of a fumigant; and distributing said fumigant throughout the remainder of said mass by means of a current of air.

6. The process of fumigating a mass of grain which consists in treating a portion of the grain with hydrocyanic acid; and distributing said hydrocyanic acid throughout the remainder of the mass of grain by means of a current of air.

7. The process of fumigating grain which comprises forming a mixture of hydrocyanic acid gas and air, and passing said mixture through the mass of grain.

In testimony whereof I affix my signature.

ERNEST C. MOFFETT.